United States Patent
Kim et al.

(10) Patent No.: US 11,629,883 B2
(45) Date of Patent: Apr. 18, 2023

(54) GAS FURNACE

(71) Applicant: LG ELECTRONICS INC., Seoul (KR)

(72) Inventors: Jusu Kim, Seoul (KR); Janghee Park, Seoul (KR); Hansaem Park, Seoul (KR); Yongki Jeong, Seoul (KR); Doyong Ha, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/522,759

(22) Filed: Jul. 26, 2019

(65) Prior Publication Data

US 2020/0033027 A1 Jan. 30, 2020

(30) Foreign Application Priority Data

Jul. 26, 2018 (KR) .................... 10-2018-0087240

(51) Int. Cl.
*F24H 9/00* (2022.01)
*F24H 3/06* (2022.01)
*F24H 3/10* (2022.01)
*F24H 9/02* (2006.01)
(Continued)

(52) U.S. Cl.
CPC ........... *F24H 9/0068* (2013.01); *F24H 3/065* (2013.01); *F24H 3/105* (2013.01); *F24H 9/0063* (2013.01); *F24H 9/0073* (2013.01); *F24H 9/02* (2013.01)

(58) Field of Classification Search
CPC .......... F24H 3/065; F24H 3/087; F24H 3/105; F24H 8/006; F24H 9/0063; F24H 9/0068; F24H 9/0073; F24H 9/02; F27B 21/00; F27D 21/00; F28D 2021/0024; F28D 7/082; F28D 7/1623; F28D 9/0031; F28F 13/08;
(Continued)

(56) References Cited

U.S. PATENT DOCUMENTS 2,877,000 A * 3/1959 Person ................. F28D 9/0031
165/159
3,399,661 A * 9/1968 Kreis ..................... F24H 3/006
126/118
(Continued)

FOREIGN PATENT DOCUMENTS

DE 19961133 C1 * 4/2001 ................ F28F 3/02

OTHER PUBLICATIONS

European Office Action issued in Application No. 19188370.1 dated Aug. 13, 2020.
European Search Report dated Oct. 18, 2019.

*Primary Examiner* — Jorge A Pereiro
*Assistant Examiner* — Logan P Jones
(74) *Attorney, Agent, or Firm* — Ked & Associates

(57) ABSTRACT

A gas furnace is provided. The gas furnace includes a combustion part in which a fuel gas is burnt to generate a combustion gas, a heat exchanger having a gas flow path through which the combustion gas flows, a blower configured to blow air around the heat exchanger, and an inducer configured to discharge the combustion gas from the heat exchanger. The heat exchanger includes at least one single path in which a single gas flow path is formed a single-multiple return bend configured to communicate with the single path and convert a flow direction of the combustion gas, and at least one multiple path having a plurality of paths that communicate with the single-multiple return bend and form multiple gas flow paths.

17 Claims, 11 Drawing Sheets

(51) Int. Cl.
*F27B 21/00* (2006.01)
*F28D 7/08* (2006.01)
*F28D 7/16* (2006.01)
*F28D 9/00* (2006.01)
*F28F 13/08* (2006.01)
*F28D 21/00* (2006.01)
*F24H 3/08* (2022.01)
*F24H 8/00* (2022.01)
*F28F 1/02* (2006.01)
*F28F 3/12* (2006.01)
*F28D 1/047* (2006.01)
*F28F 1/42* (2006.01)

(58) Field of Classification Search
CPC ............ F28F 1/02; F28F 2250/02; F28F 3/12; Y02B 30/102; Y02P 10/265; Y02P 20/124
See application file for complete search history.

(56) References Cited

U.S. PATENT DOCUMENTS

| | | | |
|---|---|---|---|
| 4,807,588 A | 2/1989 | Bentley et al. | |
| 4,982,785 A * | 1/1991 | Tomlinson | F24H 3/105 126/110 R |
| 5,271,376 A | 12/1993 | Lu et al. | |
| 5,333,598 A * | 8/1994 | Mielke | F24H 3/105 126/116 R |
| 5,359,989 A * | 11/1994 | Chase | F24H 3/105 126/110 R |
| 5,775,318 A * | 7/1998 | Haydock | F24H 8/00 126/110 R |
| 6,109,254 A * | 8/2000 | Reinke | F24H 3/105 126/110 R |
| 6,422,306 B1 * | 7/2002 | Tomlinson | F28D 1/035 165/170 |
| 6,793,015 B1 * | 9/2004 | Brown | F23C 3/002 165/170 |
| 6,938,688 B2 * | 9/2005 | Lengauer, Jr. | F24H 3/105 165/170 |
| 8,646,442 B2 * | 2/2014 | Manohar | F28D 9/0031 126/112 |
| 2002/0040777 A1 * | 4/2002 | Tomlinson | F28D 1/035 165/163 |
| 2003/0102115 A1 * | 6/2003 | Lengauer, Jr. | F28F 3/04 165/170 |
| 2011/0174291 A1 * | 7/2011 | Manohar | F24H 3/105 126/112 |
| 2011/0174301 A1 | 7/2011 | Haydock et al. | |
| 2013/0014740 A1 | 1/2013 | Tolleneer et al. | |

* cited by examiner

GAS FURNACE

CROSS-REFERENCE TO RELATED APPLICATION(S)

This application claims priority under 35 U.S.C. § 119 to Korean Application No. 10-2018-0087240 filed on Jul. 26, 2018, whose entire disclosure is hereby incorporated by reference.

BACKGROUND

1. Field

The present invention relates to a gas furnace, and more particularly, to a gas furnace having improved heat transfer performance, by increasing the heat transfer area and the turbulence occurrence on the surface of a heat exchanger and by uniformizing the flow distribution of the combustion gas passing through the inside of the heat exchanger.

2. Description of the Related Art

Generally, a gas furnace is an apparatus that heats indoor air by exchanging air supplied to a room with a flame and a high temperature combustion gas that are generated when the fuel gas is burned.

The gas furnace according to the related art has a problem that the heat generated during the combustion of the fuel gas may not be effectively transmitted to the room air.

In order to solve such a problem, a plurality of concave portions or unevenness portions are formed in the flow path of the heat exchanger through which the combustion gas passes, thereby enlarging the heat transfer area. However, since the turbulence on the surface of the heat exchanger is not sufficiently generated due to the simple shape or arrangement of the concave part or unevenness portion, there is a problem that the heat transfer performance is not greatly improved.

Further, the temperature of the combustion gas decreases as it reaches an outlet, and thus the density of the combustion gas increases and the flow rate becomes slow, thereby reducing the heat exchange performance between the combustion gas and the room air.

Further, there is a problem that flames generated upon combustion of the fuel gas directly contact the flow path of the heat exchanger, thereby damaging the flow path.

SUMMARY OF THE INVENTION

The present invention has been made in view of the above problems, and provides a gas furnace whose heat transfer area is enlarged.

The present invention further provides a gas furnace in which turbulence occurrence on the surface of a heat exchanger is increased.

The present invention further provides a gas furnace in which the flow distribution of the combustion gas passing through the inside of the heat exchanger is uniformized.

The present invention further provides a gas furnace that prevents a flame generated during combustion of fuel gas from directly reaching the flow path.

In accordance with an aspect of the present invention, a gas furnace includes: a combustion part in which a fuel gas is burnt to generate a combustion gas; a heat exchanger having a gas flow path through which the combustion gas flows; a blower configured to blow air around the heat exchanger; and an inducer configured to discharge the combustion gas from the heat exchanger, wherein the heat exchanger includes: at least one single path in which a single gas flow path is formed; a single-multiple return bend configured to communicate with the single path and convert a flow direction of the combustion gas; and at least one multiple path having a plurality of paths that communicate with the single-multiple return bend and form multiple gas flow paths.

The single path includes: an inflow single path in which a combustion gas inlet is formed; and at least one intermediate single path disposed between the inflow single path and the multiple path, wherein a single-single return bend is disposed between the inflow single path and the intermediate single path to convert a flow direction of the combustion gas, wherein the single-multiple return bend is disposed between the intermediate single path and the multiple path.

The heat exchanger is formed by joining a pair of panels, wherein the gas flow path is formed in each of the pair of panels by a pair of convex portions protruding outwardly that face each other.

A plurality of concave portions recessed inward are formed in a surface of at least two paths among the plurality of paths provided in the multiple path.

The concave portion formed in a surface of one side of each of the at least two paths is staggered from the concave portion formed in a surface of the other side opposite to the one side.

The concave portion formed in a surface of a path positioned on an upper side among the at least two paths is staggered from the concave portion formed in a surface of a path positioned on a lower side.

A diameter of a flow path of each of the at least two paths is equal to each other in a portion where the concave portion is not formed, and a depth of the concave portion increase as it progresses toward a lower side of the multiple path.

A diameter of the flow path of each of the at least two paths decrease as it progresses in a lower direction of the multiple path from a portion where the concave portion is not formed, and a depth of the concave portion decrease as it progresses toward a lower side of the multiple path.

A length of each of the at least two paths increases as it progresses toward the lower side of the multiple path.

In the single-multiple return bend, a diameter of a flow path of a portion connected to the multiple path decrease as it progresses toward a lower side of the multiple path.

A single discharge path for discharging the combustion gas by unifying the multiple gas flow paths is formed in an end portion of the multiple path.

The single discharge path includes a combustion gas discharge port that is formed in a position close to a lowermost path among the plurality of paths provided in the multiple path.

A diameter of a gas flow path formed in the inflow single path increase as it progresses toward a downstream of the inflow single path, and a diameter of a gas flow path formed in the single-single return bend increases as it progresses from a portion connected to the inflow single path to a portion reaching a certain acute angle.

BRIEF DESCRIPTION OF THE DRAWINGS

The above and other objects, features and advantages of the present invention will be more apparent from the following detailed description in conjunction with the accompanying drawings, in which.

DETAILED DESCRIPTION

Figure 1:
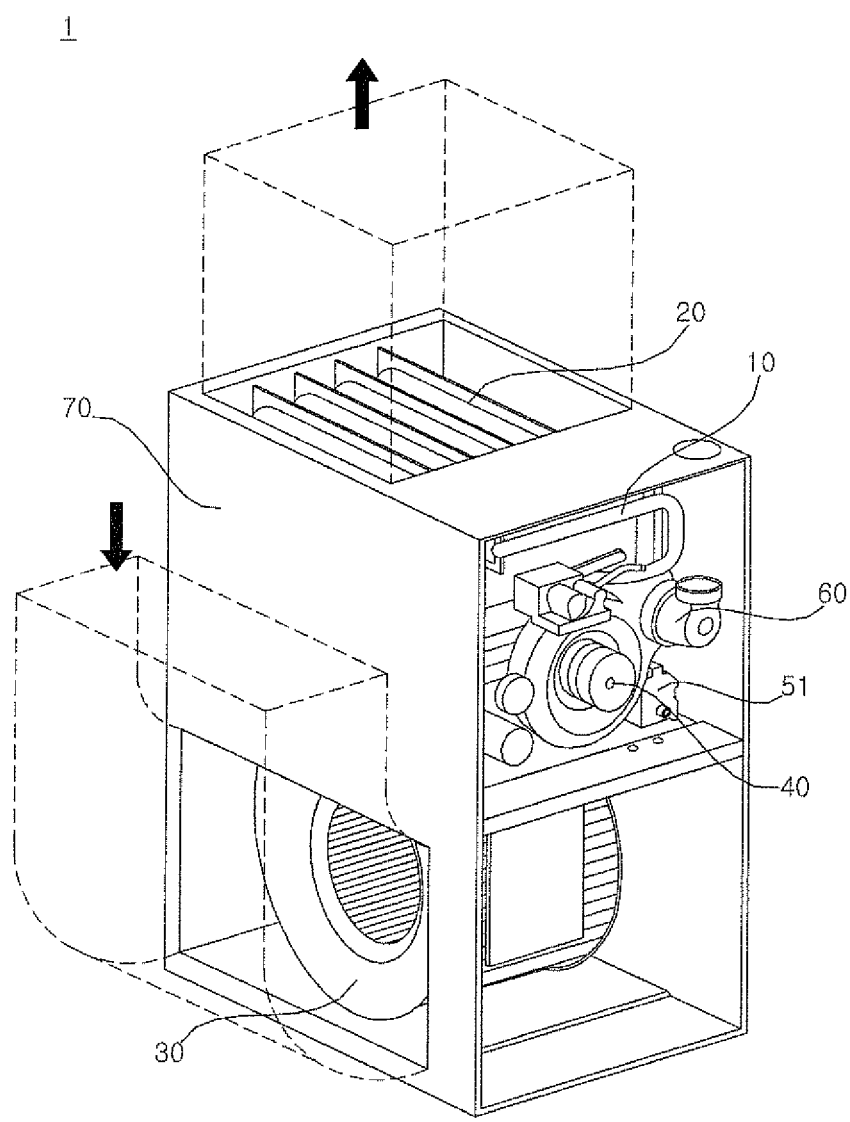
FIG. 1 is a perspective view of a gas furnace according to the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

Although the terms "first," "second," etc., may be used herein to describe various components, these components should not be limited by these terms. These terms are only used to distinguish one component from another component. When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise. In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

Figure 2:
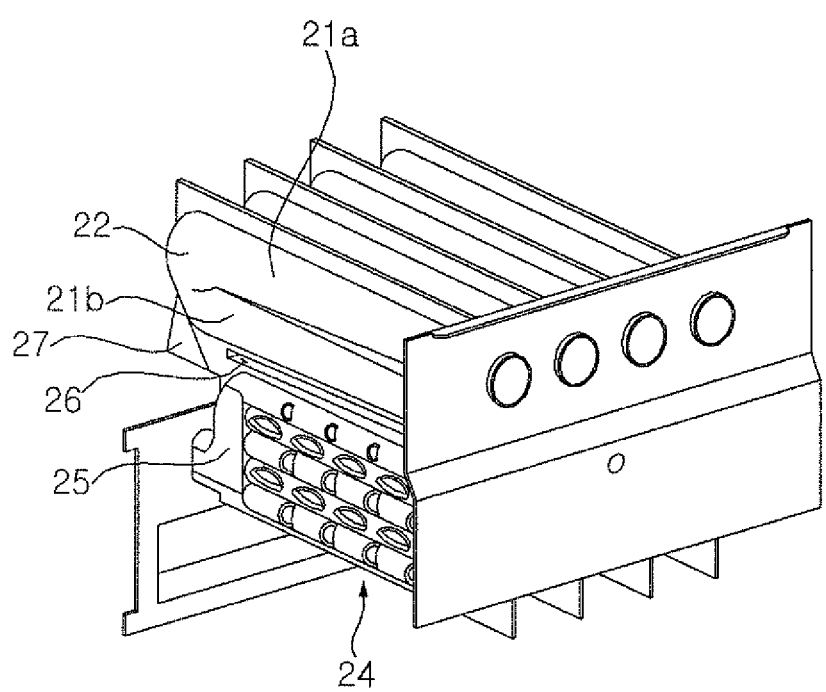
FIG. 2 is a perspective view of a heat exchanger according to an embodiment of the present invention.
Figure 3:
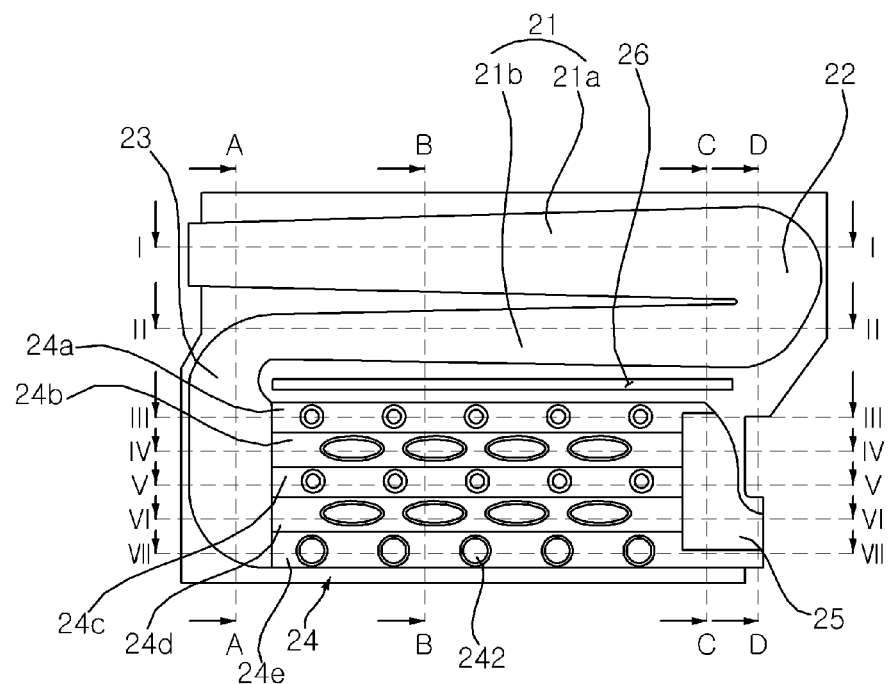
FIG. 3 is a plan view of a heat exchanger according to an embodiment of the present invention.
Figure 4:
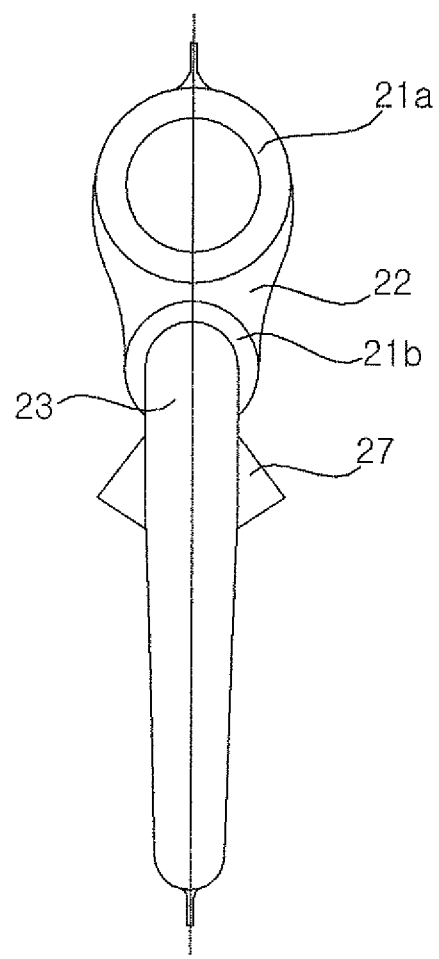
FIG. 4 is a side view of a heat exchanger according to an embodiment of the present invention.
Figure 5:
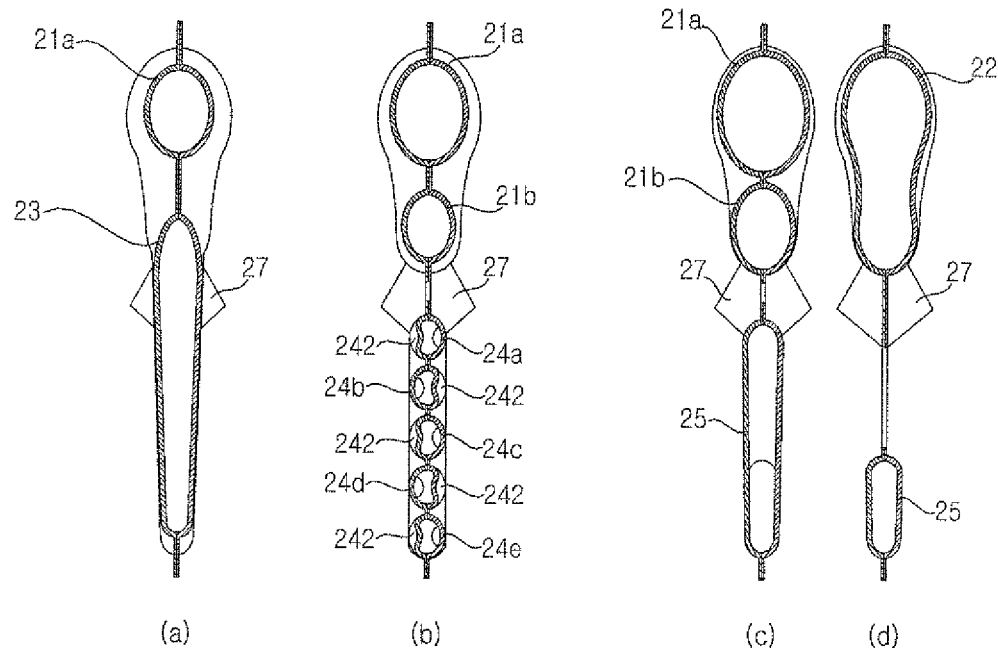
FIG. 5 is a cross-sectional view taken along lines A-A, B-B, C-C and D-D in FIG. 3.
Figure 6:
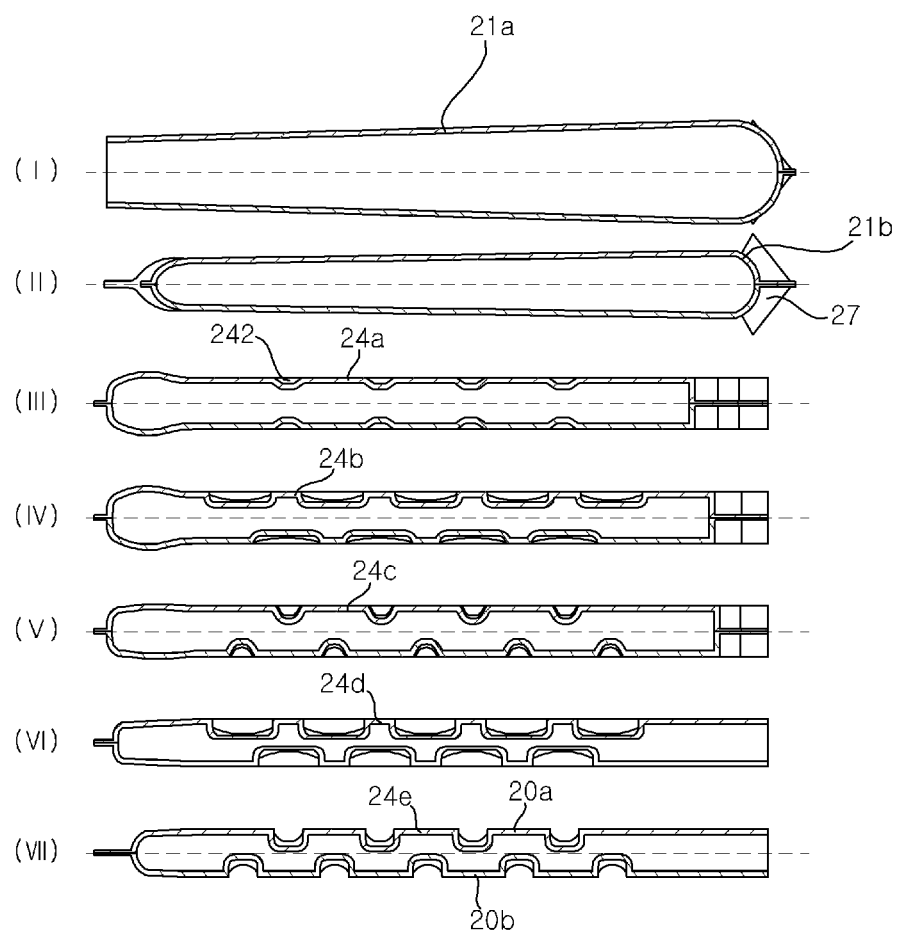
FIG. 6 is a cross-sectional view taken along lines II-II, IV-IV, V-V, VI-VI and VII-VII in FIG. 3.
Figure 7:
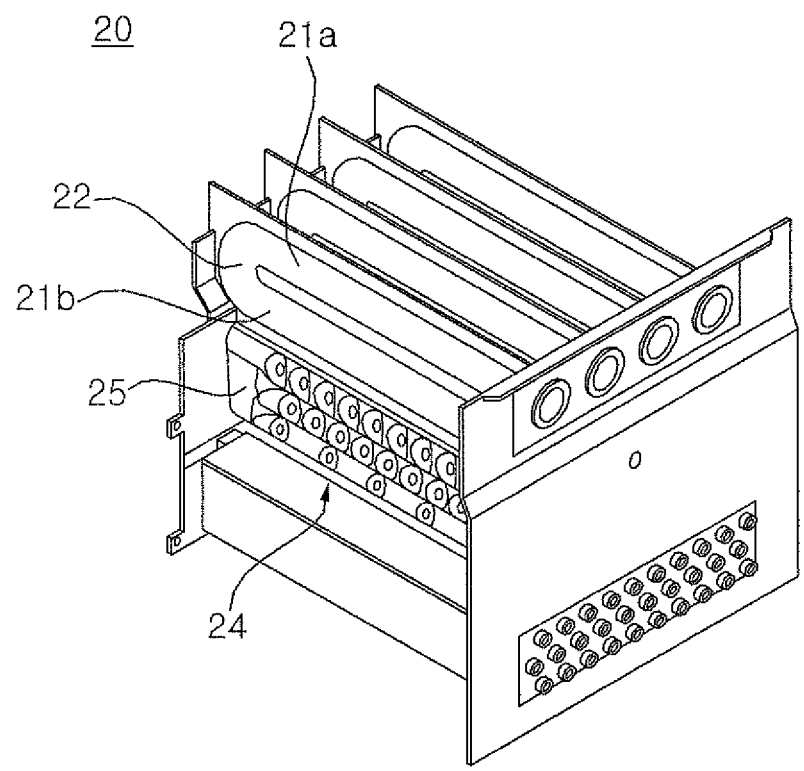
FIG. 7 is a perspective view of a heat exchanger according to another embodiment of the present invention.
Figure 8:
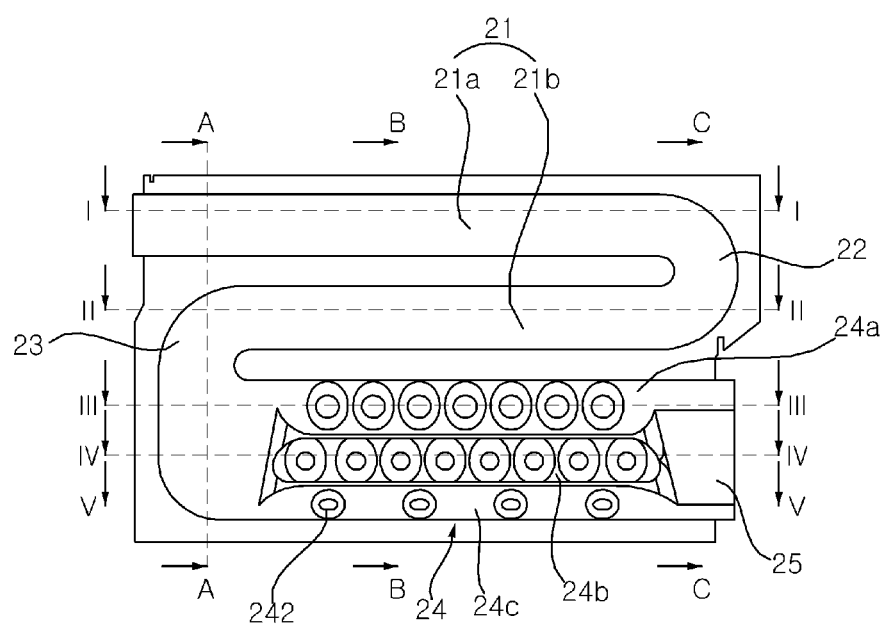
FIG. 8 is a plan view of a heat exchanger according to another embodiment of the present invention.
Figure 9:
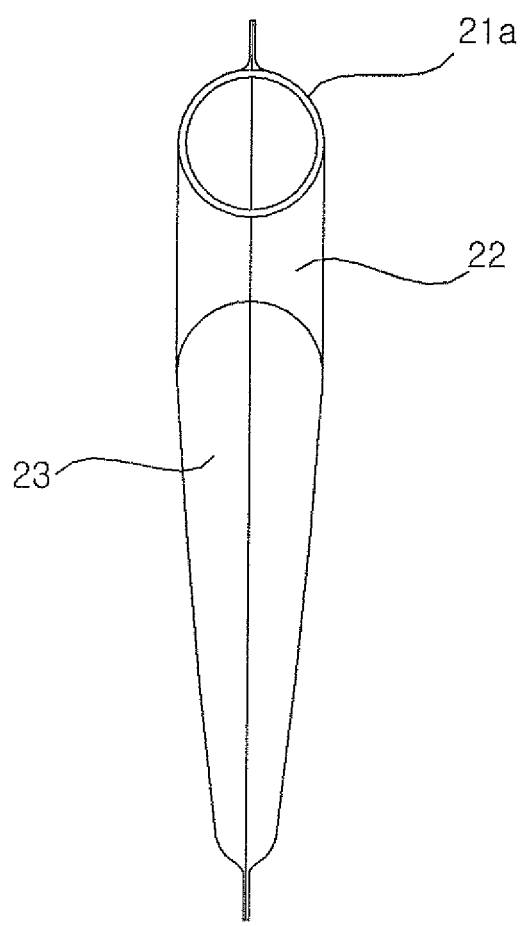
FIG. 9 is a side view of a heat exchanger according to another embodiment of the present invention.
Figure 10:
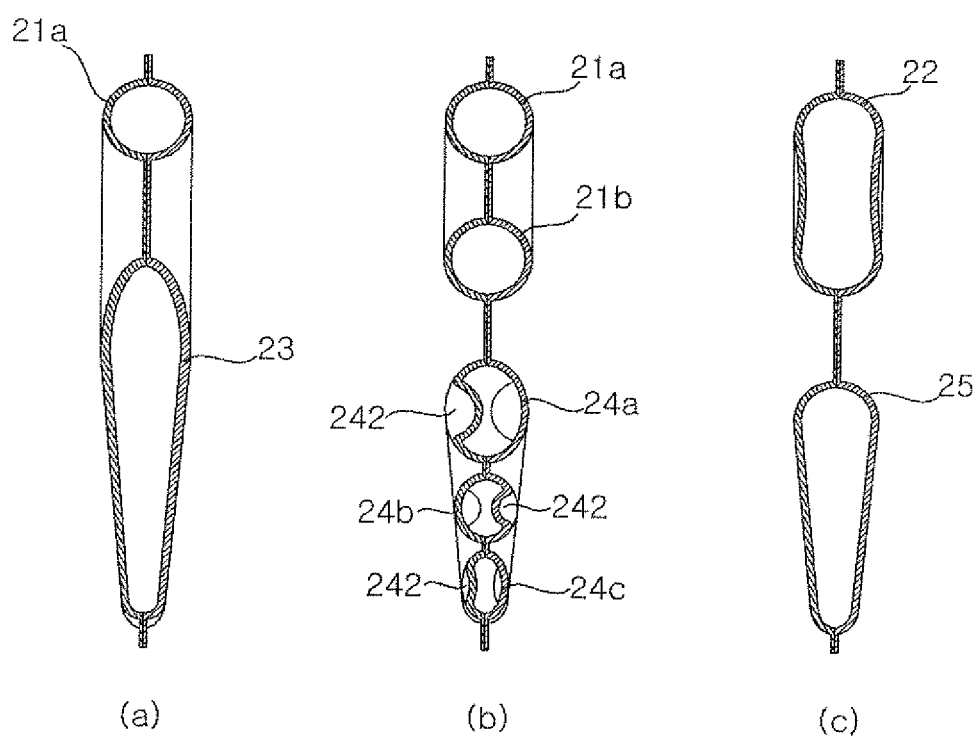
FIG. 10 is a cross-sectional view taken along lines A-A, B-B, and C-C in FIG. 8.
Figure 11:
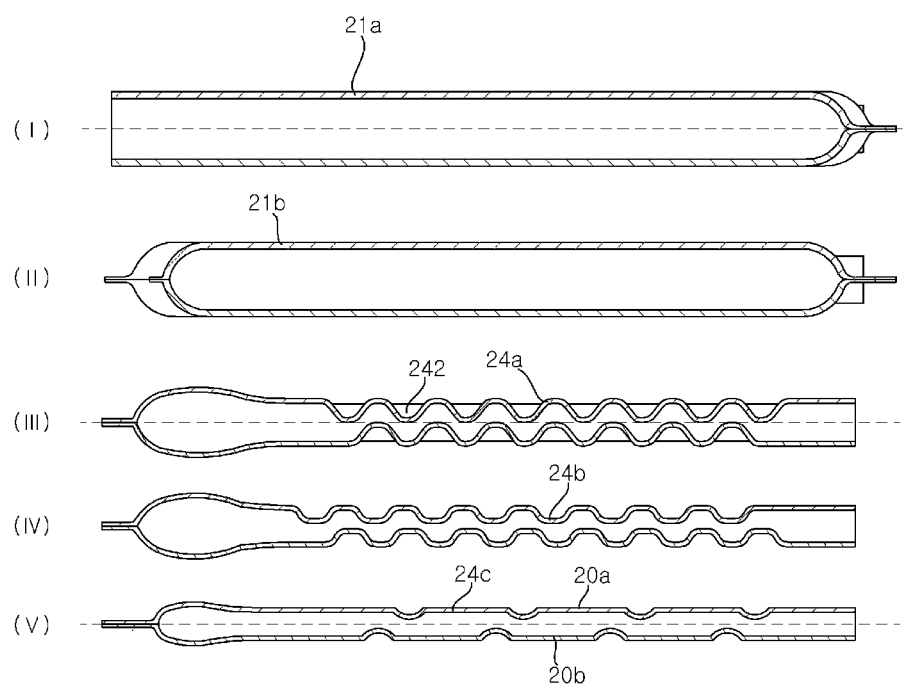
FIG. 11 is a cross-sectional view taken along lines I-I, II-II, III-III, IV-IV and V-V in FIG. 8.

FIG. 1 is a perspective view of a gas furnace according to the present invention. FIG. 2 is a perspective view of a heat exchanger according to an embodiment of the present invention. FIG. 3 is a plan view of a heat exchanger according to an embodiment of the present invention. FIG. 4 is a side view of a heat exchanger according to an embodiment of the present invention. FIG. 5 is a cross-sectional view taken along lines A-A, B-B, C-C and D-D in FIG. 3. FIG. 6 is a cross-sectional view taken along lines I-I, II-II, III-III, IV-IV, V-V, VI-VI and VII-VII in FIG. 3. FIG. 7 is a perspective view of a heat exchanger according to another embodiment of the present invention. FIG. 8 is a plan view of a heat exchanger according to another embodiment of the present invention. FIG. 9 is a side view of a heat exchanger according to another embodiment of the present invention. FIG. 10 is a cross-sectional view taken along lines A-A, B-B, and C-C in FIG. 8. FIG. 11 is a cross-sectional view taken along lines I-I, II-II, III-III, IV-IV and V-V in FIG. 8.

Referring to FIGS. 1 to 11, a gas furnace 1 according to the present invention will be described as follows.

The gas furnace 1 according to the present invention is an apparatus for heating the room by exchanging the air supplied to the room with the flame and the combustion gas P of high temperature generated when the fuel gas R is burned.

The heat transfer performance factor of the gas furnace 1 include the increase in the heat transfer area, the uniformizing of the flow distribution of a combustion gas P in a flow path or a pass, or an increase in the surface turbulence occurrence in the heat exchanger, or the like. It is an object of the present invention to suggest a method of increasing the above factor.

As shown in FIG. 1, a gas furnace 1 according to the present invention includes a combustion part 10 in which a fuel gas R is burnt to generate a combustion gas P, a heat exchanger 20 in which a flow path for flowing a combustion gas P is formed, a blower 30, and an inducer 40.

The combustion part 10 may include a gas valve 11, a gas manifold 12, a nozzle 13, a burner assembly 14, and an ignitor 18 (not shown).

The fuel gas R may be burned in the combustion part 10 to generate a flame and a combustion gas P. Generally, liquefied natural gas (LNG) obtained by cooling and liquefying natural gas, or liquefied petroleum gas (LPG) obtained by pressurizing and liquefying a gas obtained as a byproduct of a petroleum refining process may be used as the fuel gas R.

The fuel gas R may be injected into the gas manifold 12 from the gas valve 11 and sprayed toward the burner assembly 14 through the nozzle 13. In addition, the air (specifically, oxygen) required for combustion may be introduced into the burner assembly 14 together with the fuel gas R through a space between the nozzle 13 and the burner assembly 14.

At this time, the one end of the nozzle 13 and the one end of the burner assembly 14 facing the one end of the nozzle 13 are dispose to be spaced apart from each other. Therefore, in order that the fuel gas R injected from one end of the nozzle 13 is accurately sprayed toward a preset position of the one end of the burner assembly 14, it is preferable to secure a sufficient straightness of the fuel gas R, by making the diameter of one end of the nozzle 13 to be small (e.g., about 1 mm) and making the spraying speed of the fuel gas R to be fast (e.g., about 2 m/s).

The burner assembly 14 may include a burner body part 15 and a flange part 16. The burner assembly 14 may be formed by vertically joining a pair of metal panels, but the present invention is not limited thereto.

The burner body part 15 may include an inlet 151 through which the fuel gas R and the air are introduced, a venturi tube 152 through which the introduced fuel gas R and the air are mixed and pass, and a head part 153 that discharges the mixed fuel gas R and the air toward a heat exchanger 20 described later.

Since not only the fuel gas R sprayed from the nozzle 13 but also the air flowing between the inlet 151 and one end of the nozzle 13 facing the inlet 151 flows into the inlet 151, it is preferable that the diameter of the inlet 151 is larger than the diameter of one end of the nozzle 13.

The venturi tube 152 may be disposed between the inlet 151 and the head part 153, and may be formed in such a manner that the diameter gradually decreases from the inlet 151 to a certain distance.

Thus, the pressure of the fuel gas R and the air flowing through the venturi tube 152 from the inlet 151 to the certain distance is lowered (also, flow rate increase), so that the amount of air introduced between the inlet 151 and one end of the nozzle 13 into the inlet 151 may be increased.

A separate swirler may be installed inside the venturi tube 152. It is possible to increase the mixing ratio of the fuel gas R and air passing through the venturi tube 152, through a swirling vane formed in the swirler. That is, the flow stream of the fuel gas R and the air may be circulated through the swirler to increase the mixing ratio.

The mixed fuel gas R and air (hereinafter referred to as 'mixed air') may be discharged toward the heat exchanger 20 described later, through the head part 153. The head part 153 may be circular, but is not limited thereto.

The head part 153 may be provided with a retainer 17 having a plurality of through holes. In the head part 153, the mixed air is ignited by a spark generated in an ignitor 18 described later, and a flame generated at this time may be seated in the retainer 17.

The flange part 16 may extend from both sides of the burner body part 15. When a plurality of burner assemblies 14 are applied, the flange part 16 of respective burner assemblies 14 may connect the adjacent burner body parts 15 integrally. That is, the plurality of burner body parts 15 may be connected to each other by the medium of the flange part 16.

Such a configuration may allow to manage a plurality of burner assemblies 14 integrally and easily provide a plurality of burner assemblies 14 to be adjacent to a plurality of heat exchangers 20 described later.

The flange part 16 may include an upper flange part 16a and a lower flange part 16b. At this time, the upper and lower flange parts 16a and 16b extending from both sides of the head part 153 may be spaced apart from each other by a certain distance to form a flame propagation hole 161.

In detail, an example in which the burner assembly 14 is formed by joining the metal panels vertically is explained. The burner assembly 14 can be manufactured by vertically joining the upper panel 14a of the burner assembly and the lower panel 14b of the burner assembly that constitute approximately half of the burner body part 15 and the flange part 16 respectively.

Each of the approximately half flange part 16 formed in each of the upper and lower panels 14a and 14b of the burner assembly may be extended in parallel from both ends of the approximately half burner body part 15 formed in each of the upper and lower panels 14a and 14b of the burner assembly.

At this time, among each of the approximately half flange part 16 formed in the upper and lower panels 14a and 14b of the burner assembly respectively, portions extended from both ends of the approximately half of the head part 153 formed in the upper and lower panels 14a and 14b of the burner assembly respectively may be formed to be spaced apart from each other by a certain distance when the upper and lower panels 14a and 14b of the burner assembly are vertically joined.

That is, a part of the flange part 16 extended from both side surfaces of the head part 153 formed by vertically joining the upper and lower panels 14a and 14b of the burner assembly may be provided with a certain opening, i.e., the flame propagation hole 161.

The ignitor 18 may be installed adjacent to the upper end of the head part 153. When a plurality of burner assemblies 14 are applied to the gas furnace 1 according to the present invention, the ignitor 18 may be installed adjacent to the upper end of only one of the head part 153 of each of the plurality of burner assemblies 14.

For example, when first to fourth burner assemblies 14 are disposed from the left to the right, the ignitor 18 may be installed only in the upper end of the head part 153 of the first burner assembly 14.

In this case, due to spark ignition of the ignitor 18, combustion starts first in the upper end of the head part 153 of the first burner assembly 14, and the flame generated at this time is transmitted to the head part 153 of the second to fourth burner assemblies 14 through the flame propagation hole 161, and may cause combustion in turn.

A part of the gas manifold 12, the nozzle 13, the burner assembly 14, the retainer 17, and the ignitor 18 may be accommodated in a burner box 19.

One end of the burner box 19 adjacent to the head part 153 may be connected to the heat exchanger 20 described later. A support plate (not shown) may be installed between one end of the burner box 19 and the heat exchanger 20. That is, one end of the burner box 19 may be connected to the heat exchanger 20 by the medium of the support plate.

An inlet (not shown) may be formed in the support plate. Through the inlet of the support plate, a path described later and the head part 153 may communicate with each other.

A burner box gasket (not shown) as a sealing material may be provided between one end of the burner box 19 and the support plate. The burner box gasket may prevent the flame and the combustion gas P generated due to the combustion of mixed gas in the head part 153 from leaking. The material of the burner box gasket may be synthetic rubber, but may be made of other material such as metal.

The gas valve 11 for supplying the fuel gas R to the gas manifold 12 may be installed in the support plate, but is not limited thereto.

The flame and the combustion gas P generated by the combustion of mixed gas in the head part 153 may pass through the heat exchanger 20. The flame and the combustion gas P that pass through the heat exchanger 20 may be heat-exchanged with the air passing around the heat exchanger 20. Thermal energy is transferred from the flame and the combustion gas P to the air by the medium of the heat exchanger 20, so that the temperature of the air may be raised.

That is, the indoor air may be heated by passing the air supplied to the room around the heat exchanger 20 through which the flame and the combustion gas P pass.

As shown in FIG. 7, the heat exchanger 20 may include a first heat exchanger and a second heat exchanger.

When a plurality of the burner assemblies 14 are provided, a plurality of first heat exchangers 20 may be provided in correspondence with the plurality of the burner assemblies, and the plurality of first heat exchangers may be disposed in parallel with each other. Hereinafter, for the sake of brevity, any one of the first heat exchangers will be described.

One end of the first heat exchanger may be disposed adjacent to the combustion part 10. The first heat exchanger may be coupled to the support plate. A burner box 19 may be coupled to one side of the support plate, and the first heat exchanger may be coupled to the other side of the support plate. The first heat exchanger may communicate with the head part 153 through the inlet of the support plate.

The other end opposite to one end of the first heat exchanger may be coupled to a coupling box (not shown). The combustion gas P passing from one end of the first heat exchanger to the other end may be transferred to the second heat exchanger through the coupling box.

One end of the second heat exchanger may be connected to the coupling box. The combustion gas P having passed through the first heat exchanger may flow into one end of the second heat exchanger and pass through the second heat exchanger.

The second heat exchanger may perform heat exchange once again between the combustion gas P passing through the first heat exchanger and the air passing around the second heat exchanger.

That is, the efficiency of the gas furnace 1 according to the present invention may be improved by further utilizing the thermal energy of the combustion gas P that has passed through the first second heat exchanger through the second heat exchanger.

The combustion gas P passing through the second heat exchanger is condensed through a process of heat transfer with the air passing around the second heat exchanger to generate condensed water. For this reason, a gas furnace having the first heat exchanger and the second heat exchanger may be referred to as a condensing gas furnace.

The condensed water generated at this time may be collected in a condensed water collecting part. To this end, the other end opposite to one end of the second heat exchanger may be connected to one side of the condensed water collecting part.

An inducer 40 described later may be coupled to the other side of the condensed water collecting part. Hereinafter, for the sake of simplicity, it is described that the inducer 40 is coupled to the condensed water collecting part, but the inducer 40 may be coupled to the mounting plate to which the condensed water collecting part is coupled.

An opening may be formed in the condensed water collecting part. The other end of the second heat exchanger and the inducer 40 may communicate with each other through the opening formed in the condensed water collecting part.

That is, the combustion gas P that passed through the other end of the second heat exchanger may escape to the inducer 40 through the opening formed in the condensed water collecting part, and then may be discharged to the outside of the gas furnace 1 via an exhaust pipe 60.

In addition, the condensed water passed through the other end of the second heat exchanger may escape to a trap 51 through the condensed water collecting part, and then may be discharged to the outside of the gas furnace 1 via a drain pipe.

At this time, the trap 51 may be coupled to the other side of the condensed water collecting part. The condensed water passed through the other end of the second heat exchanger may be collected together with the condensed water generated in the exhaust pipe 60 connected to the inducer 40, and discharged through the drain pipe.

For this, the trap 51 may be provided with a condensed water inlet of the second heat exchanger side through which the condensed water passed through the other end of the second heat exchanger is introduced, and a condensed water inlet of the exhaust pipe side through which the condensed water generated in the exhaust pipe 60 is introduced.

That is, the condensed water generated when the combustion gas P which is not yet condensed in the other end of the second heat exchanger is condensed through the exhaust pipe 60 may also be collected by the trap 51 and discharged to the outside of the gas furnace 1 via a drain pipe.

In addition, the gas furnace 1 may include a configuration that prevents backflow of air that may occur as a negative pressure is generated inside the heat exchanger with respect to an external atmospheric pressure in an initial operation of the gas furnace 1. Specifically, it may include a configuration that prevents the backflow of air by blocking the flow path in the trap 51 when negative pressure is generated inside the heat exchanger.

The inducer 40 may communicate with the other end of the second heat exchanger by the medium of the opening formed in the condensed water collecting part.

The inducer 40 may induce a flow stream that the combustion gas P generated from the head part 153 passes through the first heat exchanger, the coupling box, and the second heat exchanger and is discharged to the exhaust pipe 60. In this regard, the inducer 40 may be understood as an Induced Draft Motor (IDM).

One end of the inducer 40 is coupled to the other side of the condensed water collecting part and the other end of the inducer 40 is coupled to the exhaust pipe 60.

That is, the combustion gas P may be discharged to the outside of the gas furnace 1 via the first heat exchanger, the coupling box, the second heat exchanger, the inducer 40, and the exhaust pipe 60.

The gas furnace 1 according to the present invention may include a blower 30.

The blower 30 may allow air to pass around the heat exchanger 20. The air passed around the heat exchanger 20 by the blower 30 may receive the heat energy from the high temperature combustion gas P by the medium of the heat exchanger 20 so that the temperature rises. The air of risen temperature is supplied to the room, so that the room may be heated.

The blower 30 may be positioned below the gas furnace 1.

The air supplied to the room may be moved from the lower portion of the gas furnace 1 to the upper portion by the blower 30. In this regard, the blower 30 may be understood as Indoor Blower Motor (IBM).

In addition, the gas furnace 1 according to the present invention may include a case 70.

The configurations of the gas furnace 1 described above may be accommodated inside the case 70. A lower opening (not shown) may be formed in a lower portion of the case 70 adjacent to the blower 30. Air passed around the heat exchanger 20 through the lower opening may be introduced into the case 70.

In the upper portion of the case 70, an upper opening (not shown) may be formed in a side surface adjacent to the upper side of the heat exchanger 20. The air that passed around the heat exchanger 20 through the upper opening and has a risen temperature may be discharged to the outside of the case 70 and supplied to the room.

The lower opening and the upper opening may be provided with a duct (not shown) for communicating the indoor space which is a heating target with the gas furnace 1 according to the present invention, A filter (not shown) may be installed between the lower opening and the duct installed therein so as to filter foreign substances such as dust.

An opening (not shown) for the exhaust pipe through which the exhaust pipe 60 passes may be formed in the upper portion of the case 70, but not limited thereto.

Meanwhile, as described above, since the second heat exchanger is configured to additionally use the thermal energy of the combustion gas P that passed through the first heat exchanger, it may be easily understood that the efficiency of the gas furnace using the first and second heat exchangers is better than that of the gas furnace using only the first heat exchanger.

The gas furnace 1 according to the present invention may be applied not only to the gas furnace to which only the first heat exchanger is applied, but also to the gas furnaces to which the first heat exchanger and the second heat exchanger are applied.

In the gas furnace 1 according to the present invention, the shape of the first heat exchanger receives attention. Accordingly, hereinafter, the first heat exchanger will be referred to as a heat exchanger 20.

Hereinafter, the heat exchanger 20 applied to the gas furnace 1 according to a first embodiment will be described with reference to FIGS. 1 to 6.

The heat exchanger 20 is disposed adjacent to the combustion part 10 (specifically, the head part 153), and may allow the combustion gas P to pass through. The heat exchanger 20 may be provided with a gas flow path through which the combustion gas P flows.

The cross section of the gas flow path formed in the heat exchanger 20 may be circular, but is not limited thereto.

The heat exchanger 20 may be formed by joining a pair of panels. That is, the heat exchanger 20 may be a clamshell type in which two sheets of metal plates are coupled to the left and right, but the present invention is not limited thereto.

At this time, the gas flow path formed in the heat exchanger 20 may be formed in each of the pair of panels by a pair of convex portions protruding outwardly that face each other.

As shown in FIGS. 2 to 6, the heat exchanger 20 may include at least one single path 21 in which a single gas flow path 211 is formed, a single-multiple return bend 23 configured to communicate with the single path 21 and convert the flow direction of the combustion gas P, and at least one multiple path 24 configured to have a plurality of paths that communicate with the single-multiple return bend 23 and form multiple gas flow paths 241

That is, the combustion gas P flowing into the heat exchanger 20 may be flowed into the gas flow path formed in each of the single path 21, the single-multiple return bend 23, and the multiple path 24 in this order.

When a plurality of single paths 21 are provided, these may be disposed side by side, but the present invention is not limited thereto. The single path 21 may be extended in a straight line.

At this time, the single path 21 may include an inflow single path 21a formed with a combustion gas inlet (not shown), and at least one intermediate single path 21b disposed between the inflow single path 21a and the multiple path 24.

In this case, a single-single return bend 22 for changing the flow direction of the combustion gas P may be disposed between the inflow single path 21a and the intermediate single path 21b, and a single-multiple return bend 23 may be disposed between the intermediate single path 21b and the multiple path 24.

That is, the combustion gas P introduced through the combustion gas inlet may be flowed into the gas flow path formed in each of the inflow single path 21a, the single-single return bend 22, the intermediate single path 21b, the single-multiple return bend 23, and the multiple path 24 in this order.

Hereinafter, it is described that the single path 21 includes the inflow single path 21a and the intermediate single path 21b, but it is obvious that another single path may be further included, or only one single path 21 may be provided.

As shown in FIGS. 2 and 3, the diameter of the gas flow path formed in the inflow single path 21a may increase as it progresses toward the downstream of the inflow single path 21a. The downstream direction at this time refers to the direction in which the combustion gas P flows in each of the gas flow paths, and this can be identically used in the following.

In other words, the diameter of the gas flow path formed in the inflow single path 21a may increase as it progresses from the combustion gas inlet toward the longitudinal direction of the inflow single path 21a.

Further, the diameter of the gas flow path formed in the single-single return bend 22 may increase as it progresses from a portion connected to the inflow single path 21a to a portion reaching a certain acute angle, and may decrease as it progresses from the portion reaching a certain acute angle to a portion connected to the intermediate single path 21b.

In addition, the diameter of the gas flow path formed in the intermediate single path 21b may decrease as it progresses toward the downstream of the intermediate single path 21b.

In other words, the diameter of the gas flow path formed in the intermediate single path 21b may decrease as it progresses from the portion connected to the single-single return bend 22 toward the longitudinal direction of the intermediate single path 21b.

That is, a portion having the largest diameter of the gas flow path ranging from the inflow single path 21a to the intermediate single path 21b via the single-single return bend 22 may be a portion of the single-single return bend 22 that reach a certain acute angle If the flames generated in the combustion of the fuel gas R come into direct contact with the inner surface of the inflow single path 21a and the single-single return bend 22, a thermal deformation or soot may be generated in the inflow single path 21a and the single-single return bend 22, thereby weakening the durability.

However, according to the present invention, the diameter of the gas flow path from the inflow single path 21a to a part of the single-single return bend 22, which is a part where the flame is expected to be contacted, is made to be gradually larger, it is possible to prevent direct contact with the inner surface of the inflow single path 21a and the single-single return bend 22, thereby preventing damage caused by the flame.

Meanwhile, as it progresses far away from the combustion gas inlet of the inflow single path 21a, the amount of heat transfer from the combustion gas P to the air passing around the heat exchanger 20 increases, so that the temperature of the combustion gas P flowing through the gas flow path can be gradually lowered.

Considering the characteristics of the fluid that the density becomes higher and the speed becomes slower when the temperature of the combustion gas P is lowered, the diameter of the gas flow path can be made to be gradually decreased from the portion of the single-single return bend 22 reaching the certain acute angle, thereby increasing the speed of the flow of the combustion gas P.

That is, the diameter of the gas flow path may be reduced as it progresses from the portion of the single-single return bend 22 reaching the certain acute angle to the other end of the intermediate single path 21b via the one end of the intermediate single path 21b.

Thus, the speed of the combustion gas P flowing through this portion increased, so that the performance of heat transfer with the air passing around the heat exchanger 20 may be improved.

In multiple path 24, a plurality of paths in communication with the single-multiple return bend 23 can be merged in a line. At this time, since each of the plurality of paths forms a gas flow path, multiple gas flow paths 241 may be formed in the multiple path 24.

The combustion gas P flowing into the multiple path 24 may flow in each of the multiple gas flow paths 241 formed in the multiple path 24. At this time, the directions of the combustion gas P passing through respective multiple gas flow paths 241 may all be the same. That is, the flow of the combustion gas P may be distributed through the multiple path 24, which will be described later in more detail.

The cross section of each of the multiple gas flow paths 241 formed in the multiple path 24 may be circular, but is not limited thereto.

In particular, as will be described later, when a concave portion 242 is formed in the multiple path 24, the cross-section of each of the multiple gas flow paths 241 may not be any one constant shape.

The plurality of paths provided in the multiple path 24 may be disposed in parallel with each other.

In addition, the plurality of paths may be spaced apart by a certain distance by an abutting portion (not shown).

That is, the plurality of paths provided in the multiple path 24 may be merged in a line by the abutting portion. Thus, the stability of the multiple path 24 may be improved in comparison with the case where the plurality of paths provided in the multiple path 24 are merged without the abutting portion.

The number of paths provided in the multiple path 24 may be two or more, and is not particularly limited. It is merely an illustrative example that FIGS. 2, 3, and 6 for explaining the gas furnace 1 according to a first embodiment describe that the multiple path 24 includes first, second, third, fourth, and fifth paths, 24a, 24b, 24c, 24d, and 24e, and FIGS. 7, 8, and 11 for explaining the gas furnace 1 according to a second embodiment described later describe that the multiple path 24 includes the first, second, and third paths, 24a, 24b, and 24c. In the present invention, the number of the plurality of paths provided in the multiple path 24 is not limited.

One end of the multiple path 24 may be connected to the single-multiple return bend 23 and the other end may be connected to the coupling box.

A single discharge path 25 for discharging the combustion gas P by unifying the multiple gas flow paths 241 may be formed at the end of the multiple path 24, which will be described later in more detail.

A plurality of concave portions 242 recessed inward may be formed on each surface of at least two of the plurality of paths provided in the multiple path 24.

Such a concave portion 242 may be formed in the downstream direction of the multiple path 24 and may be called as a dimple shape.

That is, FIGS. 2, 3 and 6 show that the concave portion 242 is formed in the surface of all of the plurality of paths provided in the multiple path 24, but the concave portion 242 may be formed only on a part of the surface of them.

The cross-section of the concave portion 242 may be circular or elliptical. When the cross-section of the concave portion 242 is elliptical, the cross-section of the concave portion 242 may be longer in the longitudinal direction than the circumferential direction of each of the plurality of paths.

In this case, it is possible to minimize flow obstruction of the combustion gas P passing through the multiple path 24 while increasing turbulence occurrence of the air passing through the surface of the multiple path 24.

In addition, turbulence of air passing through the surface of the multiple path 24 may be further increased, when a circular concave portion 242 and an elliptical concave portion 242 are formed together on the surface of the multiple path 24.

As shown in FIG. 6, the concave portion 242 formed in the surface of one side of each of the at least two paths may be staggered with the concave portion 242 formed in the surface of the other side facing the one side.

As described above, if the case where the heat exchanger 20 is formed by joining a pair of panels is explained by way of example, the concave portion 242 may be formed in the surface of approximately half of the multiple path 24 formed in a left panel 20a and the surface of approximately half of the multiple path 24 formed in a right panel 20b, and the concave portion 242 may be disposed in a staggered manner on the surfaces facing each other.

In addition, as shown in FIGS. 2, 3 and 6, the concave portion 242 formed in the surface of the upper path of the at least two paths may be staggered with the concave portion 242 formed in the surface of the lower path.

As described above, if the case where the heat exchanger 20 is formed by joining a pair of panels is explained by way of example, the concave portion 242 may be formed in the surface of the first to fifth paths 24a to 24e provided in the approximately half of the multiple path 24 formed in the left panel 20a, and the concave portion 242 may be disposed in a staggered manner in the paths adjacent to each other.

Similarly, the concave portion 242 is formed in the surface of the first to fifth paths 24a to 24e provided in the approximately half of the multiple path 24 formed in the right panel 20b, and the concave portion 242 may be disposed in a staggered manner in the paths adjacent to each other.

That is, since the plurality of concave portions 242 are disposed to intersect with each other in the upper, lower, left, and right sides of the multiple path 24, accordingly, the turbulence occurrence of air passing around the multiple path 24 is increased to improve the heat transfer performance.

The single-multiple return bend 23 is a tube joint that changes the flow of the fluid (combustion gas P) in the path by about 180 degrees, and may be referred to as a U-shaped bend. Thus, the flow of the combustion gas P passing through the path before and after the single-multiple return bend 23 may be changed by 180 degrees. This is true of the single-single return bend 22 as well.

As described above, when the gas furnace 1 according to the first embodiment includes the inflow single path 21a, the intermediate single path 21b, and the multiple path 24, it may include the single-single return bend 22 and the single-multiple return bend 23.

The single-single return bend 22 may connect the inflow single path 21a with the intermediate single path 21b and communicate with them, and the single-multiple return bend 23 may connect the intermediate single path 21b with the multiple path 24 and communicate with them.

Thus, the combustion gas P flowing in a first direction through the inflow single path 21a may pass through the single-single return bend 22, and then may flow in a second direction having a difference of about 180 degrees with respect to the first direction through the intermediate single path 21b.

In addition, the combustion gas P flowing in the second direction through the intermediate single path 21b may pass through the single-multiple return bend 23, and then may flow in the third direction having a difference of about 180 degrees with respect to the second direction through the multiple path 24. At this time, the third direction may be the same direction as the first direction.

In addition, the flow of combustion gas P in the third direction in the multiple path 24 may be distributed to each of the multiple gas flow paths 241 formed in the multiple path 24.

Meanwhile, the one end of the single-multiple return bend 23 may be connected to the intermediate single path 21b and the other end may be connected to the multiple path 24. At this time, as described above, since the multiple path 24 have a plurality of paths, the other end of the single-multiple return bend 23 may be formed to be vertically longer than one end of the single-multiple return bend 23.

Then, the cross-section of the single-multiple return bend 23 may change from a circular shape to an elliptical shape as it progresses from one end of the single-multiple return bend 23 to the other end of the single-multiple return bend 23.

In this case, the length of the long axis inside the single-multiple return bend 23 may be gradually increased as it progresses from one end of the single-multiple return bend 23 to the other end.

Thus, a single gas flow path 211 formed in the intermediate single path 21b and the multiple gas flow paths 241 formed in the multiple path 24 may communicate with each other by the medium of the single-multiple return bend 23.

Meanwhile, as shown in FIGS. 2, 3 and 6, in the gas furnace 1 according to the first embodiment, the diameter of the flow path of each of the at least two paths may be the same in a portion where the concave portion 242 is not formed.

In other words, the diameter of the flow path of each of the at least two paths may be the same regardless of the distance in the downward direction of the multiple path 24 in the portion where the concave portion 242 is not formed. Referring to FIGS. 2, 3, 5 and 6, at this time, the downward direction of the multiple path 24 may mean a direction toward the fifth path 24e from the first path 24a, and the same meaning may be used below.

In this case, the depth of the concave portion 242 may increase as it progresses toward the lower side of the multiple path 24.

Further, a single discharge path 25 for discharging the combustion gas P by unitizing the multiple gas flow paths 241 may be formed in the end of the multiple path 24.

As described above, when the gas furnace 1 according to the first embodiment also includes the second heat exchanger, the single discharge path 25 may mediate the connection of the multiple path 24 and the coupling box.

At this time, the cross-section of the flow path formed in the single discharge path 25 is elliptical, and the length of the long axis inside the single discharge path 25 becomes smaller as it progresses in the longitudinal direction of the single discharge path 25 from a portion connected to the multiple path 24.

In other words, the single discharge path 25 may be provided with a combustion gas discharge port (not shown) formed in a position close to the lowermost path (e.g., the fifth path 24e) among the plurality of paths provided in the multiple path 24. In this case, as shown in FIGS. 2 and 3, the single discharge path 25 may have a streamlined shape.

Due to such a configuration, the flow of the combustion gas P may be uniformly distributed to each of the multiple gas flow paths 241 formed in the multiple path 24. This will be described in more detail as follows.

As described above, since the cross section of the single-multiple return bend 23 is formed to be vertically long as it progresses from one end of the single-multiple return bend 23 to the other end, due to the inertia, the flow of the combustion gas P passing through the single-multiple return bend 23 may be concentrated in the flow path positioned in the lower side of the multiple gas flow paths 241 formed in the multiple path 24.

That is, the combustion gas P that passed through the inflow single path 21a, the single-single return bend 22, and the intermediate single path 21b to acquire a lower temperature is in a state of increased density, the flow of the combustion gas P after passing through the single-multiple return bend 23 may be concentrated in the flow path positioned the lower side of the multiple gas flow paths 241 formed in the multiple path 24.

Furthermore, the shape of the single-multiple return bend 23 vertically formed to be long may also be a factor that serves in such a manner that the flow of the combustion gas P on the multiple gas flow paths 241 formed in the multiple path 24 is concentrated in the lower flow path rather than the upper flow path.

In other words, the combustion gas P passing through the single-multiple return bend 23 flows along the shape of the single-multiple return bend 23 formed to be long downward, so that the flow of the combustion gas P after passing through the single-multiple return bend 23 may be concentrated downward.

Referring to FIG. 3, the flow of the combustion gas P that passed through the single-multiple return bend 23 may be concentrated in a flow path formed in the fifth path 24e and on an adjacent flow path.

However, in the gas furnace 1 according to the first embodiment, the depth of the concave portion 242 formed in the surface of the multiple path 24 may increase as it progresses toward the lower side of the multiple path 24, thereby solving the above mentioned problem.

Referring to FIG. 6, since the depth of the concave portion 242 increases as it progresses from the first path 24a toward the fifth path 24e, the flow disturbance of the combustion gas P by the concave portion 242 may increase as it progresses toward the fifth path 24e from the first path 24a.

That is, due to the temperature (or density) of the combustion gas P and the shape of the single-multiple return bend 23, the flow of the combustion gas P that passed through the single-multiple return bend 23, which is concentrated in the flow path positioned in the lower side of the multiple gas flow paths 241, can be uniformly distributed by adjusting the depth of the concave portion 242.

Further, as described above, the streamlined single discharge path 25 is associated with the above configuration, and may help to uniformly distribute the flow of the combustion gas P in the multiple path 24 in the gas furnace 1 according to the first embodiment.

In sum, in the case where the diameters of the portions where the concave portion 242 is not formed in the multiple gas flow paths 241 are the same, the depth of the concave portion 242 is made to be increased as it progresses toward the lower side and the streamlined single discharge path 25 is included, so that the flow of combustion gas P that passed through the single-multiple return bend 23 can be uniformly distributed to the multiple gas flow paths 241.

As a result, the performance of heat transfer between the combustion gas P passing through the multiple path 24 and the air passing around the multiple path 24 may be improved.

The heat exchanger 20 may further include a single path adjacent to the multiple path 24, and an opening 26 extending, between the multiple path 24, in the direction parallel to the downstream direction of the multiple path 24.

That is, as shown in FIGS. 2 and 3, the heat exchanger 20 may further include an opening 26 extending, between the intermediate single path 21b and the first path 24a, in the direction parallel to the downstream direction of the multiple path 24.

Such an opening 26 may allow the air blown from the lower side to the upper side of the heat exchanger 20 by the blower 30 to easily circulate in the left and right direction of the plurality of heat exchangers 20 disposed side by side.

This will be described as follows, based on the case where the first, second, third, and fourth heat exchangers 20 are disposed side by side at a certain interval from the left side to the right side, as an example.

Since the air passing between the second and third heat exchangers 20 may flow to the left or the right side through the opening 26, the air may receive heat energy from not only the second and third heat exchangers 20 but also the combustion gas P passing through the first and fourth heat exchangers 20, so that the heat transfer performance may be improved.

In addition, a flow guide 27 for guiding the flow of air passing through the heat exchanger 20 may be formed in the left and right sides of each of the plurality of heat exchangers 20.

Such a flow guide 27 may be positioned below the single-single return bend 22, as shown in FIGS. 2, 4 and 6, but is not limited thereto.

Hereinafter, with reference to FIGS. 7 to 11, the heat exchanger 20 applied to the gas furnace 1 according to the second embodiment will be described mainly based on the difference from the heat exchanger 20 applied to the gas furnace 1 according to the first embodiment, and the remaining specific configurations are the same as those described above, so a detailed description will be omitted.

The configuration for evenly distributing the flow of the combustion gas P that passed through the single-multiple return bend 23 differs from the gas furnace 1 according to the first embodiment as follows.

That is, as shown in FIGS. 7, 8, 10 and 11, in the second embodiment, the diameter of the flow path of each of the at least two paths may be made smaller as it progresses toward the lower side of the multiple path 24 in the portion where the concave portion 242 is not formed.

Referring to FIGS. 7, 8, 10 and 11, the downward direction of the multiple path 24 at this time refers to the direction from the first path 24a to the third path 24c, and may be used in the same sense in the following.

In this case, the depth of the concave portion 242 may be decreased as it progresses toward the lower side of the multiple path 24.

Further, a single discharge path 25 for discharging the combustion gas P by unitizing the multiple gas flow paths 241 may be formed in the end of the multiple path 24.

At this time, the cross section of the flow path formed in the single discharge path 25 has an elliptical shape may be the same regardless of the distance in the longitudinal direction of the single discharge path 25 from the portion connected to the multiple paths 24.

That is, unlike the streamlined single discharge path 25 according to the first embodiment, the single discharge path 25 according to the second embodiment may be a linear single discharge path 25. However, since the shape of the single discharge path 25 is not limited to a single shape for each embodiment, it is obvious that a single discharge path 25 having an appropriate shape can be applied so as to uniformly distribute the flow of the combustion gas P.

Due to such a configuration, the flow of the combustion gas P may be uniformly distributed to each of the multiple gas flow paths 241 formed in the multiple path 24. This will be described in more detail as follows.

It is described above that the flow of the combustion gas P may be concentrated in the flow path positioned in the lower side among the multiple gas flow paths 241.

That is, referring to FIG. 8, the flow of the combustion gas P that passed through the single-multiple return bend 23 may be concentrated in the flow path formed in the third path 24c and in the adjacent flow path.

However, referring to FIG. 8 to FIG. 11, as the diameter of each of the multiple gas flow paths 241 decreases as it progresses from the first path 24a to the third path 24c, the flow disturbance of the combustion gas P may increase as it progresses from the first path 24a to the third path 24c.

That is, due to the temperature (or density) of the combustion gas P and the shape of the single-multiple return bend 23, the flow of the combustion gas P that passed through the single-multiple return bend 23, which is concentrated in the flow path positioned in the lower side of the multiple gas flow paths 241, can be uniformly distributed by adjusting the diameter of each of the multiple gas flow paths 241.

However, if the depth of the concave portion 242 formed in the surface of the multiple path 24 becomes deeper as it progresses toward the lower side of the multiple path 24, the flow disturbance of the combustion gas P in the flow path positioned in the lower side among the multiple gas flow paths 241 is excessively increased, so that, on the contrary, non-uniform distribution may occur.

Therefore, it may be preferable that the depth of the concave portion 242 is decreased as it progresses toward the lower side of the multiple path 24 in terms of uniform distribution of the flow of combustion gas P.

In addition, the length of each of the at least two paths may increase as it progresses toward the lower side of the multiple path 24.

That is, as shown in FIGS. 7, 8, and 11, the lengths of the first to third paths 24a to 24c provided in the multiple path 24 may increase as it progresses from the first path 24a to the third path 24c.

Such a shape of the multiple path 24 may induce a flow from the lower side to the upper side of the combustion gas P, in a point where the single-multiple return bend 23 and the multiple path 24 are connected. In other words, it is possible to solve the problem that the combustion gas P is concentrated in the flow path positioned in the lower side of the multiple gas flow paths 241.

Further, as described above, the linear single discharge path 25 is associated with the above configuration, and may help to uniformly distribute the flow of the combustion gas P in the multiple path 24, in the gas furnace 1 according to the second embodiment.

In addition, in order to uniformly distribute the combustion gas P, the single-multiple return bend 23 may be formed such that as the diameter (or width) of the flow path of the portion connected to the multiple path 24 decreases as it progresses toward the lower side of the multiple path 24

In other words, the single-multiple return bend 23 formed to be vertically long may be formed such that the horizontal length decreases as it progresses toward the lower side. Thus, the lateral surface of the single-multiple return bend 23 may be wedge-shaped.

Due to the shape of the single-multiple return bend 23, it is possible to eliminate the concentration of the combustion gas P in the lower side of the single-multiple return bend 23.

In sum, in the case where the diameter of the portion where the concave portion 242 is not formed in each of the multiple gas flow paths 241 becomes smaller as it progresses downward, the depth of the concave portion 242 decreases as it progresses downward, the length of the multiple path 24 increases as it progresses downward, a linear single discharge path 25 is included, and a wedge-shaped single-multiple return bend 23 is provided, thereby uniformly distributing the flow of combustion gas P that passed through the single-multiple return bend 23 to each of the multiple gas flow paths 241.

As a result, the performance of heat transfer between the combustion gas P passing through the multiple path 24 and the air passing around the multiple path 24 may be improved.

The gas furnace according to the present invention has one or more of the following effects.

First, since the multiple gas flow paths in which combustion gas flows simultaneously is formed in multiple path, the heat transfer area is increased, so that the heating effect of the indoor air may be improved.

Second, since the plurality of the concave portions are formed in the surface of the multiple path, the heat transfer area is enlarged and the turbulence occurrence of the air passing through the surface of the heat exchanger is increased, so that the amount of heat transfer from the high temperature combustion gas to the room air may be increased.

Third, when the diameter of each of the multiple gas flow paths is the same, the depth of the concave portion is increased as it progresses toward the lower side of the multiple path, so that the flow distribution of the combustion gas in the multiple path becomes uniform and the heat transfer performance may be improved.

Fourth, since the diameter of the gas flow path formed in the inflow single path increases as it progresses toward the downstream of the inflow single path, the flame generated in the combustion does not directly touch the flow path, thereby improving the durability of the heat exchanger.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A gas furnace, comprising:
a combustion portion in which a fuel gas is burnt to generate a combustion gas;
a heat exchanger having a gas flow path through which the combustion gas flows;
a blower configured to blow air around the heat exchanger; and
an inducer configured to discharge the combustion gas from the heat exchanger, wherein the heat exchanger comprises:
at least one single path in which a single gas flow path is formed, the at least one single path including an inflow single path in which a combustion gas inlet is formed;
a single-multiple return bend configured to communicate with the at least one single path and convert a flow direction of the combustion gas; and
at least one multiple path having a plurality of paths forming multiple gas flow paths that are separated from each other, wherein the single-multiple return bend extends in a first direction crossing the at least one single path and the at least one multiple path, and is connected to the at least one single path and the at least one multiple path, wherein each of the plurality of paths is configured to communicate with the single-multiple return bend in parallel with the others of the plurality of paths, wherein a diameter of each of the plurality of paths decreases as a distance from the single path increases in the first direction, wherein an end of each of the plurality of paths is positioned deeper inside of the single-multiple return bend as the distance from the single path increases in the first direction, wherein a diameter of a gas flow path formed in the inflow single path gradually increases from the combustion gas inlet to an end opposite the combustion gas inlet, wherein a plurality of concave portions recessed inward is formed in a surface of at least two paths among the plurality of paths provided in the at least one multiple path, wherein a concave portion of the plurality of concave portions formed in a surface of one side of each of the at least two paths is staggered from a concave portion of the plurality of concave portions formed in a surface of the other side opposite to the one side, wherein a concave portion of the plurality of concave portions formed in a surface of a path positioned on an upper side among the at least two paths is staggered from a concave portion of the plurality of concave portions formed in a surface of a path positioned on a lower side, and wherein shapes of the plurality of concave portions formed in the surface of the path positioned on the upper side among the at least two paths and the plurality of concave portions formed in the surface of the path positioned on the lower side are different.

2. The gas furnace of claim 1, wherein the at least one single path comprises at least one intermediate single path disposed between the inflow single path and the at least one multiple path, wherein a single-single return bend is disposed between the inflow single path and the intermediate single path to convert a flow direction of the combustion gas, and wherein the single-multiple return bend is disposed between the intermediate single path and the at least one multiple path.

3. The gas furnace of claim 1, wherein the heat exchanger is formed by joining a pair of panels, and wherein the gas flow path is formed in each of the pair of panels by a pair of convex portions protruding outwardly that face each other.

4. The gas furnace of claim 1, wherein a diameter of a flow path of each of the at least two paths decreases as the flow path progresses in a lower direction of the at least one multiple path from a portion where the plurality of concave portions is not formed, and a depth of a concave portion of the plurality of concave portions decreases as the concave portion progresses toward a lower side of the at least one multiple path.

5. The gas furnace of claim 4, wherein a length of each of the at least two paths increases as it progresses toward the lower side of the at least one multiple path.

6. The gas furnace of claim 1, wherein, in the single-multiple return bend, a diameter of a flow path of a portion connected to the at least one multiple path decreases as the flow path progresses toward a lower side of the at least one multiple path.

7. The gas furnace of claim 1, wherein a single discharge path to discharge the combustion gas by unifying the multiple gas flow paths is formed in an end portion of the at least one multiple path.

8. The gas furnace of claim 7, wherein the single discharge path comprises a combustion gas discharge port that is formed in a position close to a lowermost path among the plurality of paths provided in the at least one multiple path.

9. The gas furnace of claim 2, wherein a diameter of a gas flow path formed in the single-single return bend increases as the gas flow path progresses from a portion connected to the inflow single path to a portion reaching a predetermined acute angle, and decreases as the gas flow path progresses from the portion reaching the predetermined acute angle to a portion connected to the at least one intermediate single path.

10. The gas furnace of claim 9, wherein a diameter of a gas flow path formed in the at least one intermediate single path decreases as the gas flow path progresses toward a downstream of the at least one intermediate single path.

11. The gas furnace of claim 1, wherein the heat exchanger further comprises an opening that extends, between the at least one single path and the at least one multiple path, in a direction parallel to a downstream direction of the at least one multiple path.

12. The gas furnace of claim 1, wherein a plurality of combustion portions is provided, wherein a plurality of heat exchangers is provided in correspondence with the plurality of combustion portions, and wherein the plurality of combustion portions and the plurality of heat exchangers are disposed in parallel with each other.

13. The gas furnace of claim 7, wherein a cross section of a flow path formed in the single discharge path has an elliptical shape.

14. The gas furnace of claim 13, wherein the cross section of the flow path formed in the single discharge path remains the same irrespective of a distance in a longitudinal direction of the single discharge path from the end portion of the at least one multiple path.

15. The gas furnace of claim 7, wherein a diameter of the single discharge path decreases as the single discharge path progresses in the first direction.

16. The gas furnace of claim 1, wherein a width of the plurality of concave portions formed in the surface of the path positioned on the upper side among the at least two paths is smaller than that of the plurality of concave portions formed in the surface of the path positioned on the lower side.

17. The gas furnace of claim 16, wherein the plurality of concave portions formed in the surface of the path positioned on the upper side among the at least two paths has a circular shape, and the plurality of concave portions formed in the surface of the path positioned on the lower side has an elliptical shape.

* * * * *